L. G. PETSCH.
CULTIVATOR ATTACHMENT.
APPLICATION FILED AUG. 1, 1914.
1,147,814.
Patented July 27, 1915.
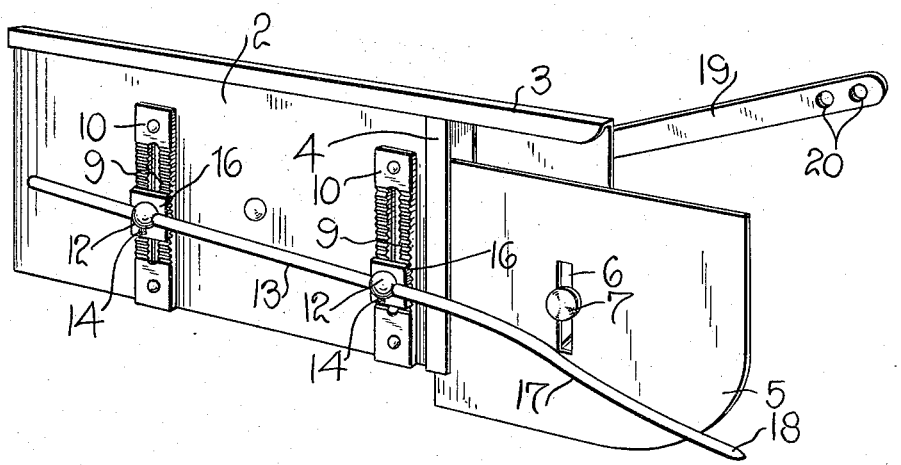
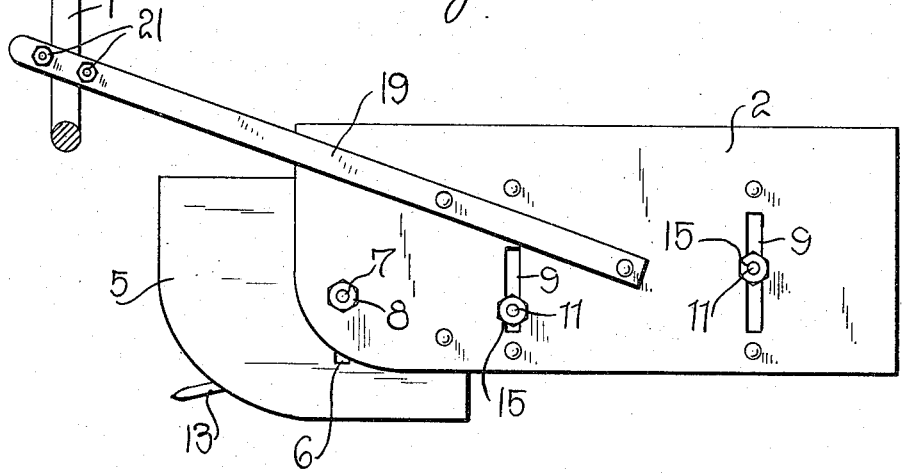
Witnesses
Robert M. Sutphen
A. I. Hind
Inventor
L. G. Petsch
By Watson E. Coleman
Attorney

UNITED STATES PATENT OFFICE.

LEO G. PETSCH, OF WENTWORTH, SOUTH DAKOTA.

CULTIVATOR ATTACHMENT.

1,147,814.  Specification of Letters Patent.  Patented July 27, 1915.

Application filed August 1, 1914. Serial No. 854,551.

*To all whom it may concern:*

Be it known that I, LEO G. PETSCH, a citizen of the United States, residing at Wentworth, in the county of Lake and State of South Dakota, have invented certain new and useful Improvements in Cultivator Attachments, of which the following is a specification, reference being had to the accompanying drawings.

This invention relates to agricultural implements, and particularly to an attachment for cultivators.

The main object of the invention is to provide in connection with a cultivator a shield adapted to be disposed at the side of the cultivator opposite to the cultivator foot or shovel, such shield being so arranged that it will prevent the earth thrown up by the cultivator from being turned over onto the small corn or other plants being cultivated, but will permit the earth to roll laterally under the shield after the cultivator shovel has passed the hill of corn.

A further object of the invention is the formation of a shield in two parts, one of these parts constituting a runner traveling upon the surface of the ground and the other part constituting a rear section, the front and rear sections being relatively adjustable.

Still another object of the invention is the provision in connection with a cultivator shield of the character stated, of an adjustable member arranged to project in advance of the shield and pick up and turn laterally any small corn or plants which may have fallen over into the path of the cultivator, and which, therefore, would be liable to be covered with the earth.

Another object of the present invention is the provision of a shield of the above character which will possess advantages in points of efficiency and durability, is inexpensive to manufacture and, at the same time, is simple in construction and operation.

With the above and other objects in view, the invention consists in the novel features of construction, combination and arrangement of parts as will be hereinafter referred to and more particularly pointed out in the specification and claims.

In the accompanying drawing forming a part of this application, Figure 1 is a detail perspective view taken from the inner side of my improved guard; and Fig. 2 is a side elevation taken from the outside of the guard.

Referring more particularly to the drawing, 1 indicates a part of the cultivator frame to which my improved shield is attached, the body of said shield including an elongated rear section formed of a plate 2 having its upper edge bent upon itself, as shown at 3 to form a channel. Secured to the plate 2 adjacent the forward end thereof, is a channel member 4, in which the inner end of a front shield section or plate 5 is arranged. This shield constitutes not only a forward shield guarding the plants from the earth thrown laterally by the cultivator shovel, but also constitutes a runner which supports the rear section 2. The plate 5 is provided with an elongated slot 6 adapted to receive a bolt 7 which extends through the plate 2 and through the slot 6, a nut 8 being threaded upon the outer end thereof, whereby the plate 5 may be adjusted vertically with respect to the plate 2 and securely retained in its adjusted position.

The plate 5 is adjustable vertically in correspondence with the depth at which the cultivator shovel is working so that the plate 5 shall ride over the ground, and so that a space shall be left between the surface of the ground, and the lower edge of the shield plate 2. As before stated, the plate 5 is disposed opposite the cultivator shovel so that the earth thrown upward and laterally by the cultivator shovel will be prevented from being thrown upon the small corn or other plants being cultivated, the plate 2 being so adjusted that it will be spaced from the surface of the ground to permit the dirt to readily pass thereunder after the shovel has passed.

The rear section 2 is provided with spaced vertical slots 9 and arranged on the inside faces of the plate are the slotted ratchet plates 10 the purpose of which will be hereinafter more fully set forth. Extending through the slots 9 are the bolts 11, the inner ends of which are provided with suitable eyes 12 in which is slidably mounted the rod 13. This rod may be securely held in position by means of set screws 14 extending through the eyes 12 or any other means may be employed if desired. Mounted upon the inner ends of the bolts 11 are the nuts 15, which are adapted to be tightened to retain the bolts in a vertically adjusted position with respect to the plate 2. The bolts 11 are provided with clamped washers 16 having corrugated inner faces adapted for engagement with the toothed plates 10, whereby to retain said bolts in a vertically adjusted position within the slots. The forward end of the rod 13 extends downwardly upon an incline, as shown at 17, the forward end 18 being disposed in advance of the forward edge of the plate 15 and also being disposed just above the ground so as to engage beneath the fallen or leaning plants and raise these plants before the cultivator can throw earth upon the plants. It will be noted that the plate 5 will shield the plant from the dirt until plant has been raised enough to permit the dirt to pass beneath it.

The plate 2 is rigidly supported from the cultivator frame by means of an arm 19, the upper end of which is provided with a plurality of spaced openings 20 adapted to receive bolts 21, whereby to rigidly suspend the same from the cultivator frame 1.

It is to be noted that there are two shields to be used in connection with the cultivator, and that I have shown in Figs. 1 and 2 the shield intended for the left side only. It is also to be understood that this device is adapted to be used with either single or double row cultivators. These shields are disposed one on each side of the ground engaging member or cultivator shovel and protect the plants on either side from being covered over by the earth turned laterally by the cultivator shovel. The device also raises the fallen stalks and leaves so that they will not be run over by the shields and covered by the earth thrown off from the cultivator. It is obvious that the rod 13 may be adjusted longitudinally and vertically and that its angle of inclination may be also adjusted. Thus the rod 13 may be adjusted to suit the peculiarities of the plants being cultivated and the nature of the ground being worked. The plate 5 may also be adjusted according to the depth to which the cultivator feet are engaging below the surface.

My improved shield, as herein shown and described, is extremely simple in construction, can be quickly attached to a cultivator or removed therefrom, and at the same time can be manufactured and placed upon the market at a comparatively low cost.

While I have shown and described the preferred form of my invention, it will be obvious that various changes in the details of construction and in the proportions may be resorted to for successfully carrying my invention into practice, without sacrificing any of the novel features or departing from the scope of the invention, as defined by the appended claims.

Having thus described this invention, what I claim is:—

1. The combination with a vertically disposed shield adapted to be mounted upon a cultivator frame at one side of the ground engaging member of the cultivator, of a plant lifter comprising a rod mounted upon said shield and projecting beyond the forward end of the same, the forward end of the rod being downwardly inclined.

2. A cultivator attachment of the character described, comprising a vertically disposed supporting member, and a plant lifter mounted upon the supporting member and comprising a longitudinally extending rod, said rod being vertically and longitudinally adjustable.

3. The combination with a vertically extending supporting member adapted to be disposed on one side of the ground engaging member of a cultivator, said supporting member being vertically slotted; of bolts adjustably mounted in said slots, said bolts having eyes, and a plant lifter comprising a rod extending through said eyes and adjustable by and with said bolts.

4. The combination with a vertically disposed supporting member adapted to be disposed on one side of the ground engaging member of a cultivator, said supporting member being vertically slotted at a plurality of points; of bolts passing each through one of said slots, each bolt having an eye upon its inner end, the bolts being vertically adjustable in the slots, and a plant lifter comprising a rod, the forward end of which is downwardly inclined, said rod passing through the eyes of the bolts and being longitudinally adjustable thereupon and vertically adjustable with the bolts.

5. The combination with a vertically disposed supporting member adapted to be mounted on one side of the ground engaging member of a cultivator, said supporting member being vertically slotted; of transversely corrugated slotted strips secured to the face of said supporting member in alinement with the slot therein, bolts passing through said slots and having eyes upon their inner faces, locking washers disposed between said bolts and corrugated strips, the inner faces of said washers being corrugated, and a plant lifting rod having its body portion passing through the eyes of said bolts and being longitudinally adjustable therein, the forward end of the rod being forwardly inclined.

In testimony whereof I hereunto affix my signature in the presence of two witnesses.

LEO G. PETSCH.

Witnesses:
J. D. MULLANY,
ANTHONY L. BERTHER.

Copies of this patent may be obtained for five cents each, by addressing the "Commissioner of Patents, Washington, D. C."